J. P. SHAW.
SURVEYING INSTRUMENT.
APPLICATION FILED MAR. 29, 1921.
1,405,017.
Patented Jan. 31, 1922.
4 SHEETS—SHEET 1.
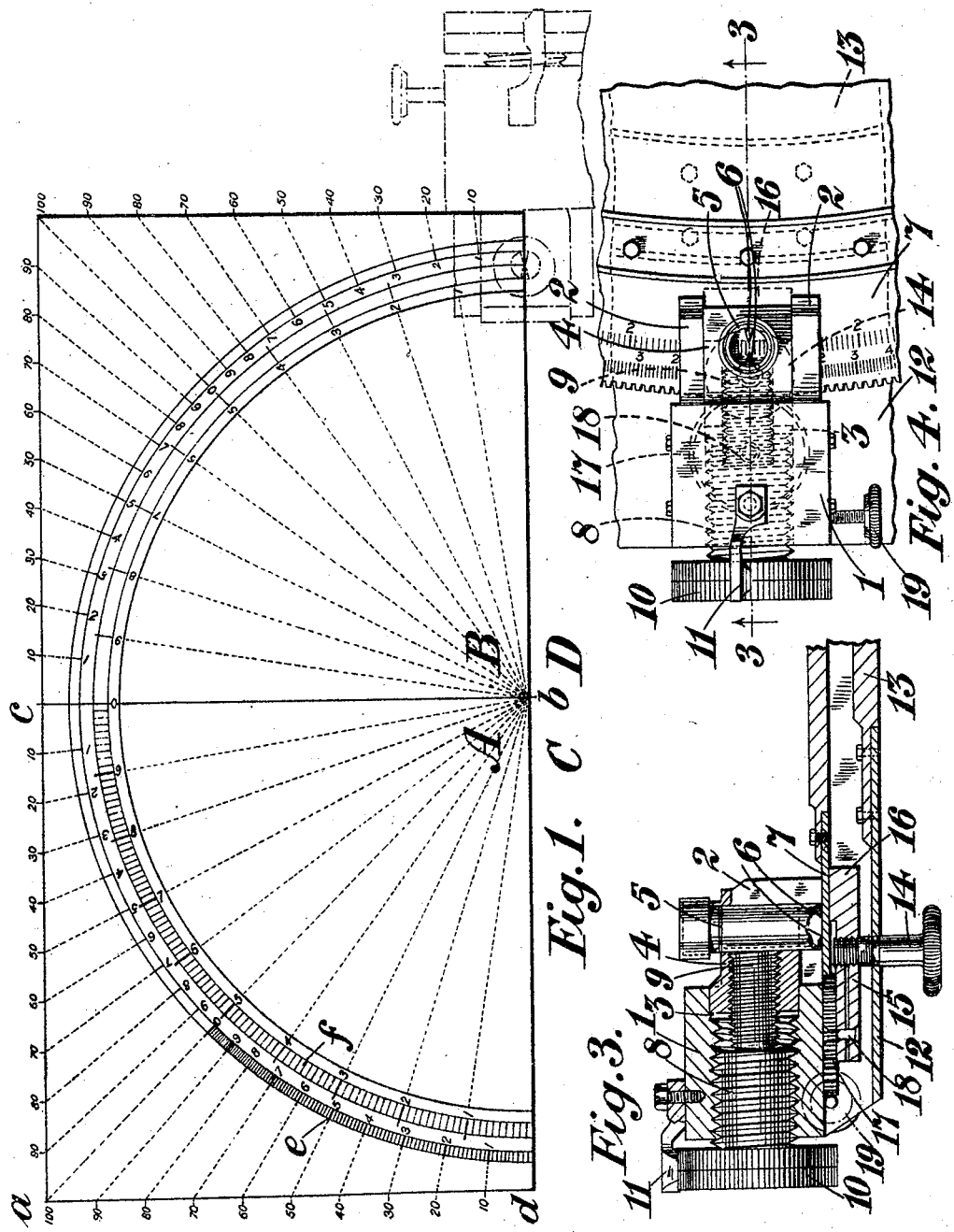

J. P. SHAW.
SURVEYING INSTRUMENT.
APPLICATION FILED MAR. 29, 1921.
1,405,017.
Patented Jan. 31, 1922.
4 SHEETS—SHEET 2.
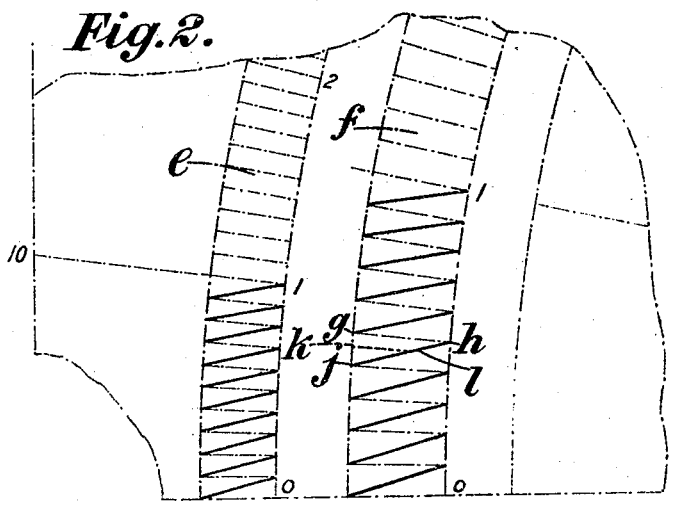
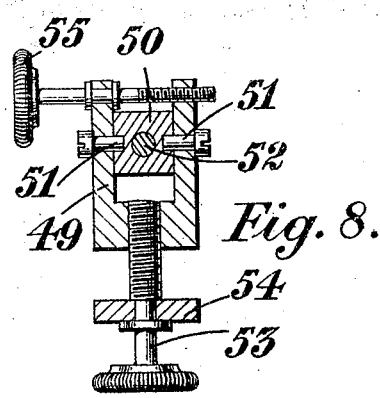
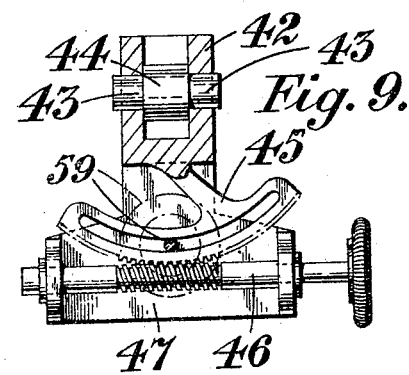

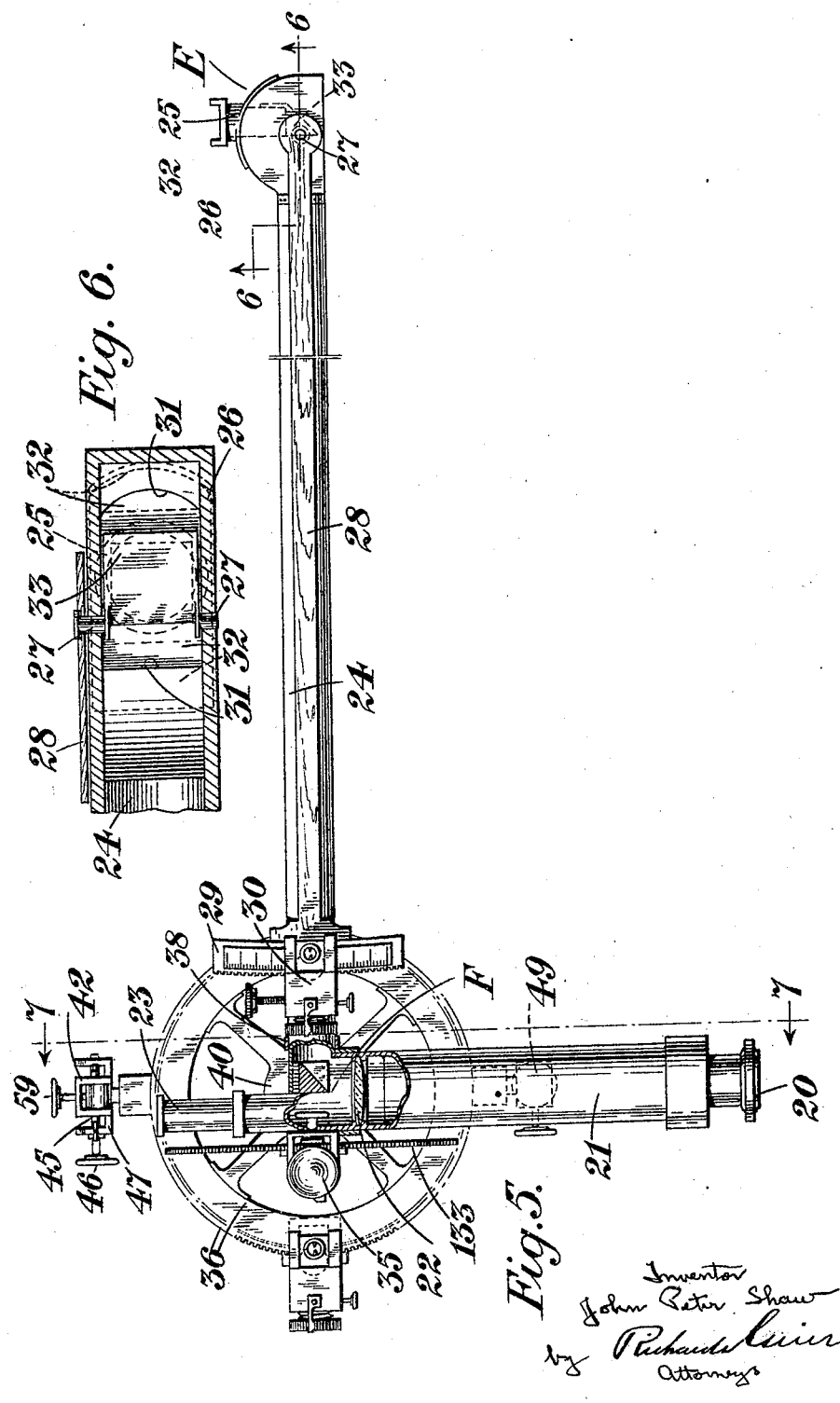

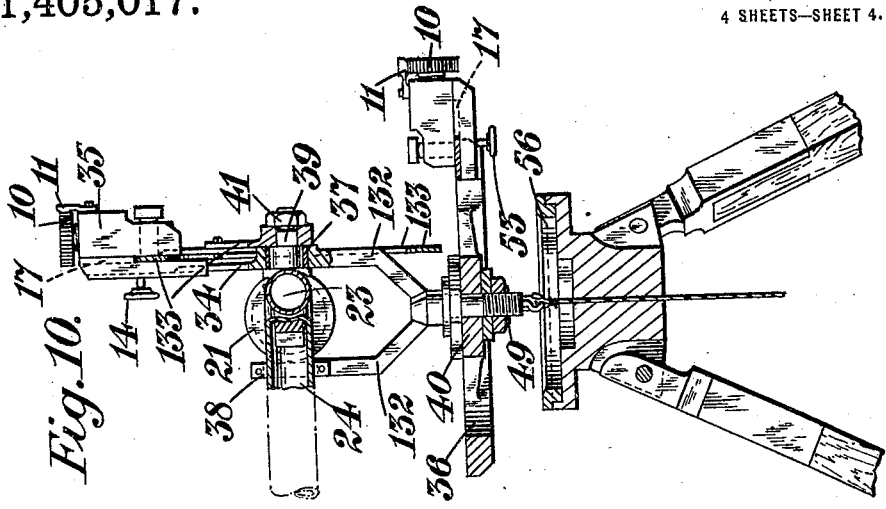
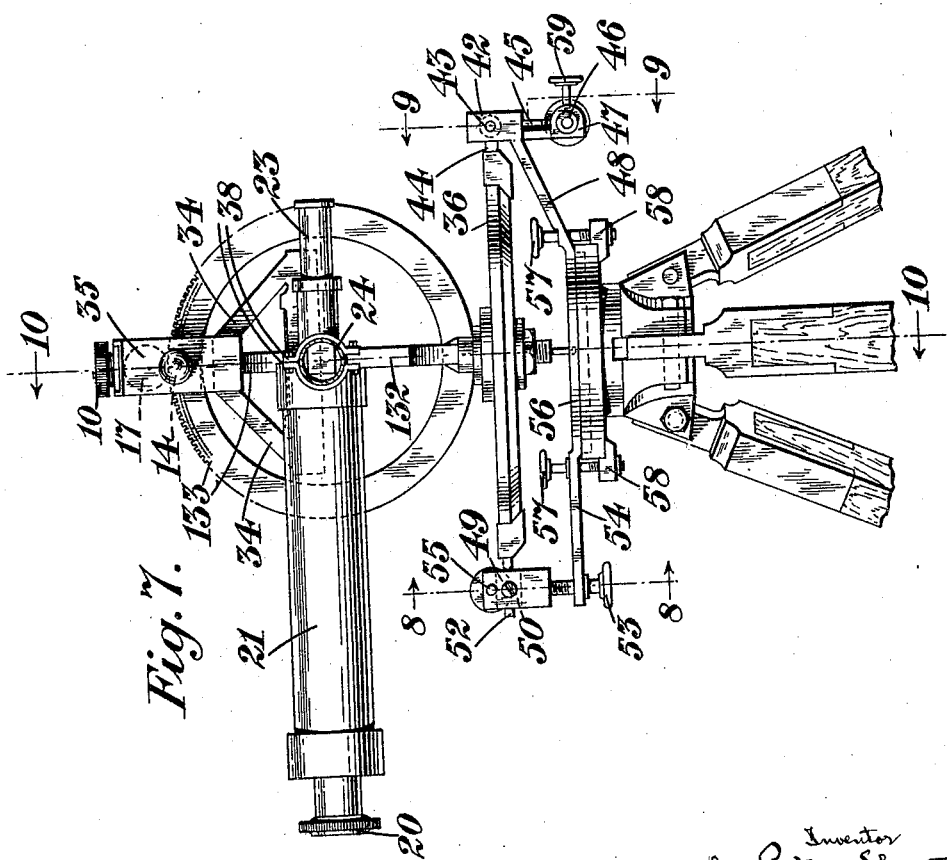

UNITED STATES PATENT OFFICE.

JOHN PETER SHAW, OF GOEDGEVONDEN, TRANSVAAL, SOUTH AFRICA.

SURVEYING INSTRUMENT.

1,405,017.  Specification of Letters Patent.  Patented Jan. 31, 1922.

Application filed March 29, 1921. Serial No. 456,647.

*To all whom it may concern:*

Be it known that I, JOHN PETER SHAW, a subject of the British Empire, residing at Goedgevonden, Transvaal Province, Union of South Africa, have invented certain Improvements in or Relating to Surveying Instruments, (for which I have filed an application in England, Mar. 6, 1920,) of which the following is a specification.

This invention relates to surveying instruments for carrying out topographical, rural, engineering, mining, aerial, and other surveys from one single point of observation without necessarily having reference to any graduated staff or rod, and without reference to trigonometrical ratios.

The instrument is of the type comprising a telescope, an arm or base tube arranged at right angles thereto and having a scale thereon near the telescope, a lever or lath having pivotal connection with said arm at its end opposite that provided with the scale, a reflector rigidly connected to the pivoted end of said lever or lath and normally at an angle of 45° to the axis of the lever and a reflector arranged within the telescope so that an object is viewed partly by direct vision and partly by reflection, the part views being brought into coincidence by adjustment of the first named reflector.

The chief features of the present invention lie in providing instruments with one or more circles each having two scales thereon to be used separately or conjointly, said scales being graduated as hereinafter described, and in the co-operation with these scales of micrometer devices, the micrometer scale of which is also graduated as hereinafter described, but the invention also includes various constructional features in surveying instruments as hereinafter described with reference to the accompanying drawings, in which—

Figure 1 is a diagram showing the circular scales of surveying instruments according to the invention.

Figure 2 is a diagram showing a portion of the scales;

Figures 3 and 4 are two views in section and elevation respectively, of a micrometer device;

Figure 5 is a plan view partly in horizontal section of an instrument embodying the invention, and Figure 6 a sectional view of a detail of the said instrument taken on the line 6—6 of Fig. 5.

Figure 7 is a sectional elevation of the instrument taken on the line 7—7 of Fig. 5 and also shows further parts of the instrument;

Figures 8 and 9 are detail views on an enlarged scale of sections taken at 8—8 of Figure 7 and 9—9 of Figure 11 respectively.

Figure 10 is a section at 10—10, Figure 7.

The circles of the instruments according to this invention are graduated as shown in Figure 1 of the drawings. In Figure 1 $a\,d\,b\,c$ is a square, the side $d\,a$ being divided into a certain number of equal parts, in this case 10, numbered 10–100 in consecutive order from $d$ to $a$. The side $a\,c$ is similarly divided and numbered from $c$ to $a$. With centre $b$ and any suitable radius several circles are drawn so as to provide two concentric scales $e$ and $f$. The major divisions of the scale $e$ are determined by the intersection with the scale circles of lines drawn from the divisions 10. 20. 30. etc. to the centre $b$. Each major division of $d\,a$ and $c\,a$. is divided into ten equal minor divisions which are transferred to the outer scale as shown. Each set of major divisions $d\,a\,a\,c$. thus occupies an octant of the circle. The scale thus formed is the ordinary scale of tangents.

Each quadrant of the inner scale F is divided into ten equiangular major divisions which in turn are subdivided into ten minor divisions, as shown. A complete circle is marked out in this way, but Figure 1 shows two quadrants A. B only, the other quadrants being merely indicated by the letters C. D.

The scales on the circles however need not be graduated precisely in this manner. For example each octant of scale E may be divided into 2, 3, 4, 5, etc., parts in the manner hereinbefore described and then subdivided as required, while the scale F may be replaced by a scale divided in the usual manner for measuring angles. In this connection it is to be observed that it has been proposed to provide circles for surveying instruments having in combination a scale the octants of which are divided tangentially each way from one or more base lines and a scale divided into degrees, minutes and seconds.

For a purpose which will be clear from the description of the micrometer device which is given hereinafter, the actual division lines are not indicated on the scales but said scales are marked as shown in Figure 2 which illustrates, to an enlarged scale, two divisions of the scales E and F. In this figure $g$, $h$, $i$, $j$, represents one minor division on the scale F and the diagonal line $h\,j$ is drawn on the scale, the division $g.\ h.$ and $i\,j$ being only construction lines. The indicators of the micrometer are adapted to move radially over the scales, so as to measure the radial distance from say, a point $k$ on the arc $g\,j$ to a point $l$ on the diagonal $h\,j$. The distance $k\,l$ is always proportional to the distance $j\,k$, and hence it follows that if the radial width of the scale E and F be taken as the unit to be subdivided by the micrometer the minor divisions of the scales can be measured.

The micrometer scales are provided on the micrometer head 10 hereinafter referred to. The circumference of this head represents the radial width of the scale E or F, which as stated above is the unit to be subdivided, and said circumference is divided into ten equal divisions. Therefore, each divison on the micrometer scales indicates $\frac{1}{10}$ of each minor division on the scale E or F, that is $\frac{1}{100}$ of each major division. If desired, each of said divisions on the micrometer scales may be divided into tenths so that the micrometer may be graduated to read hundredths of each minor division on the scale E or F that is $\frac{1}{10000}$ part of the octant or quadrant on the scales E and F respectively. Preferably the micrometer will be graduated to read to tenths of the minor divisions on the scales E and F in order to be consistent with the decimal division of said scales.

The micrometer itself is shown in Figures 3 and 4 and is employed in conjunction with both the scales on the circles.

The micrometer comprises a main body portion 1 provided with lugs 2 and between said lugs and in a recess 3 in the body portion 1 a part 4 carrying a microscope 5 is adapted to slide so that two indicators 6, carried by said microscope, co-operate with and can be moved backward and forward across the circle 7 as desired.

A screw 8 working in the body portion 1 is internally threaded to engage a screw 9 of smaller diameter engaging the part 4. The screw is so constructed that the difference between the pitches of the parts 8 and 9 is equal to the radial width of the scale E or F in Figure 1, i. e. the distance to be subdivided by the micrometer, so that the resultant movement caused by one complete revolution of the screw carries the microscope this distance either backward or forward over the circles.

Attached to the screw at the larger end 8 is a circular head 10 marked on the circumference with micrometer scales E and F graduated as hereinbefore described to subdivide the scales E and F respectively, so that they can be read against the "reader" 11 attached to the body portion 1. The whole is carried on a channel bracket 12 fastened to the casing 13 of the surveying instrument and carrying a screw 14 which is mounted to turn but not slide in the bracket 12 and is also threaded into a clamp 15. This clamp is a plate with a part 16 projecting just under the circle 7. A toothed wheel 17 is attached by a countersunk headed pin 18 to the clamping plate 15 said wheel being actuated by a screw 19 carried in the sides of the bracket 12 and engaging a toothed rim of the circle 7 to provide a fine adjustment.

The clamp 15 is so constructed that the part 16 clamps the circle 7 against the micrometer just before the wheel 17 touches the body portion 1 and when it is withdrawn far enough leaves the circle free to slide along the micrometer. The position of the micrometer on the circle is further shown in dot and pick lines in Figure 1.

The purpose of the monocular type of instrument shown in Figures 5 and 6 is to bring images seen at two points G and H, simultaneously to focus at the eyepiece 20.

As already described, the base tube 24 is firmly attached to the main telescope at right angles. The main stem 132 is forked above the horizontal circle 36 as shown in Figure 10 forming an opening to receive the telescope 21 which can revolve in a bush 37 in one branch of the fork and in bush plates 38 in the other branch.

The vertical circle 133 is mounted on a square end 39 of the telescope trunnion and the horizontal circle 36 is fitted to a square part on the main stem 132 which revolves in a horizontal support 40.

The horizontal framing is similar in construction to the framing of the vertical circle or it may be circular to enclose the circle as long as it is stout and broad enough at the ends to be rigidly clamped in position.

In Figure 10, 41 are adjusting and retaining nuts. Figures 9 and 11 show the supporting and levelling device at one side of the horizontal circle. 42 is a channel iron held together by bolts and supporting on a pivot 43 a bracket 44. To said bracket is attached a toothed sector 45 engaging an adjusting screw 46 mounted in projections on the bracket 44. The channel iron 42 is secured to an arm and a clamping screw 59 is provided to secure the sector 45 in position.

Figure 8 shows the supporting device at the other side of the horizontal circle; 49 is a strong square nut with a channel top receiving a smaller square nut 50 with trunnions 51 and pierced by a hole to receive the end of the circle support 52.

The nut 49 engages a screw 53 which is held by washers or in a groove in an arm 54, so that it can turn but not slide therein. The channel nut 49 at the top may be tightened by a screw 55 as shown. It is obvious that the two adjusting screws 46 and 53 can sufficiently adjust to proper level both base and telescope.

The arms 48 and 54 and "bed" 56 are cast in one piece. The bed is a stout circular ring, square in section and fitting into a similar ring in the head of the tripod.

This last ring is attached to the brackets of the legs of the tripod. The bed can then rotate completely in the head ring and is clamped by two bolts 57, Figure 7, bearing on the arms 48 and 54 and screwing into two angle pieces 58.

The instrument hereinbefore described may be used for the measurement of actual distances and their vertical and horizontal components.

I claim—

1. In a surveying instrument, a device presenting a circle having two scales thereon, the octants of one of said scales being tangentially graduated from base lines divided into any number of equal major parts, said major divisions being subdivided into equal minor divisions, each quadrant of the other scale being divided into equiangular divisions for measuring angles, the graduation lines on said scales being the diagonal lines joining opposite ends of consecutive division lines.

2. In a surveying instrument, a device presenting a circle having two scales thereon, the octants of one of said scales being tangentially graduated from base lines divided into ten major parts, said major divisions being subdivided into ten equal minor divisions, while each quadrant of the other scale is divided into ten major divisions subdivided into ten minor divisions for measuring angles, the graduation lines on said scales being the diagonal lines joining opposite ends of consecutive division lines.

3. In a surveying instrument, a device presenting a circle having two scales thereon, the octants of one of said scales being tangentially graduated from base lines divided into any number of equal major parts, said major divisions being subdivided into equal minor divisions, each quadrant of the other scale being divided into equiangular divisions for measuring angles, the graduation lines on said scales being the diagonal lines joining opposite ends of consecutive division lines, and a micrometer device cooperating with said circle scales whereby subdivisions of the minor divisions of the scales on the circles may be measured.

4. In a surveying instrument, a device presenting a circle having two scales thereon, the octants of one of said scales being tangentially graduated from base lines divided into any number of equal major parts, said major divisions being subdivided into equal minor divisions, each quadrant of the other scale being divided into equiangular divisions for measuring angles, the graduation lines on said scales being the diagonal lines joining opposite ends of consecutive division lines, and a micrometer device cooperating with said circle scales whereby subdivisions of the minor divisions of the scales on the circles may be measured, said micrometer device having two indicators adapted to move radially over said scales, said micrometer device having a head on which the micrometer scales are marked, the circumference of said head corresponding to the radial width of the scales and being decimally divided.

5. In a surveying instrument, a device presenting a circle having two scales thereon, the octants of one of said scales being tangentially graduated from base lines divided into any number of equal major parts, said major divisions being subdivided into equal minor divisions, each quadrant of the other scale being divided into equiangular divisions for measuring angles, the graduation lines on said scales being the diagonal lines joining opposite ends of consecutive division lines, and a micrometer device cooperating with said circle scales whereby subdivisions of the minor divisions of the scales on the circles may be measured, said micrometer device having two indicators adapted to move radially over said scales, said micrometer device having a head on which the micrometer scales are marked, the circumference of said head corresponding to the radial width of the scales and being decimally divided, said micrometer device including a screw carrying a microscope provided with said indicators and arranged to move said indicators a distance equal to the radial width of the scales in one complete revolution of the screw.

6. A micrometer device comprising a main body, a part slidable on said body, a microscope carried by said part, a screw threaded through the main body and having an extension threaded into said part, the two portions of the screw being of different pitches, for the purpose set forth.

Signed at Goedgevonden, Transvaal Province, Union of South Africa, this 4th day of February, 1921.

JOHN PETER SHAW.